US008756522B2

(12) United States Patent
Lee et al.

(10) Patent No.: US 8,756,522 B2
(45) Date of Patent: Jun. 17, 2014

(54) PORTABLE ELECTRONIC DEVICE AND METHOD OF CONTROLLING SAME

(75) Inventors: John Jong-Suk Lee, Thornhill (CA); Jason Tyler Griffin, Kitchener (CA); Michael George Langlois, Almonte (CA); Alen Mujkic, Mississauga (CA); David William Bukurak, Ottawa (CA)

(73) Assignee: BlackBerry Limited, Waterloo (CA)

( * ) Notice: Subject to any disclaimer, the term of this patent is extended or adjusted under 35 U.S.C. 154(b) by 186 days.

(21) Appl. No.: 12/727,979

(22) Filed: Mar. 19, 2010

(65) Prior Publication Data

US 2011/0231789 A1    Sep. 22, 2011

(51) Int. Cl.
*G06F 3/048*    (2013.01)

(52) U.S. Cl.
USPC .......................................................... 715/773

(58) Field of Classification Search
USPC ......... 715/773, 784, 786, 830, 856, 863, 864, 715/973; 345/123, 173–178, 684, 688
See application file for complete search history.

(56) References Cited

U.S. PATENT DOCUMENTS

| | | | | |
|---|---|---|---|---|
| 5,121,114 | A * | 6/1992 | Nagasawa et al. ............. | 345/688 |
| 6,310,610 | B1 * | 10/2001 | Beaton et al. ................... | 345/173 |
| 6,411,283 | B1 * | 6/2002 | Murphy ........................ | 345/173 |
| 6,714,221 | B1 * | 3/2004 | Christie et al. ................. | 715/784 |
| 7,091,954 | B2 * | 8/2006 | Iesaka ............................ | 345/168 |
| 7,958,455 | B2 * | 6/2011 | Doar .............................. | 715/784 |
| 2002/0030667 | A1 * | 3/2002 | Hinckley et al. ............... | 345/173 |
| 2002/0067346 | A1 * | 6/2002 | Mouton ......................... | 345/173 |
| 2002/0135602 | A1 * | 9/2002 | Davis et al. .................... | 345/684 |
| 2003/0043123 | A1 * | 3/2003 | Hinckley et al. ............... | 345/173 |
| 2003/0043174 | A1 * | 3/2003 | Hinckley et al. ............... | 345/684 |
| 2004/0021676 | A1 * | 2/2004 | Chen et al. ..................... | 345/684 |
| 2005/0024341 | A1 * | 2/2005 | Gillespie et al. ............... | 345/173 |
| 2006/0026535 | A1 * | 2/2006 | Hotelling et al. .............. | 715/863 |
| 2006/0164399 | A1 * | 7/2006 | Cheston et al. ................. | 345/173 |
| 2007/0125633 | A1 * | 6/2007 | Boillot .......................... | 200/52 R |
| 2007/0185631 | A1 * | 8/2007 | Yeh et al. ......................... | 701/36 |
| 2007/0220442 | A1 | 9/2007 | Bohan | |
| 2008/0094369 | A1 * | 4/2008 | Ganatra et al. ................. | 345/173 |
| 2008/0165142 | A1 * | 7/2008 | Kocienda et al. .............. | 345/173 |

(Continued)

FOREIGN PATENT DOCUMENTS

| | | | |
|---|---|---|---|
| CN | 101356493 A | 1/2009 | |
| CN | 101393506 A | 3/2009 | |

(Continued)

OTHER PUBLICATIONS

European Patent Application No. 10157013.3, European Search Report dated Jun. 30, 2010.

(Continued)

*Primary Examiner* — Enrique Iturralde
(74) *Attorney, Agent, or Firm* — Geoffrey deKleine; Borden Ladner Gervais LLP (57) ABSTRACT

A method of controlling a portable electronic device that has a touch-sensitive display includes displaying information on the touch-sensitive display, detecting a gesture on the touch-sensitive display, scrolling through the information in a first scrolling mode when the gesture is associated with a first area of the touch-sensitive display, and scrolling through the information in a second scrolling mode when the gesture is associated with a second area of the touch-sensitive display.

15 Claims, 5 Drawing Sheets

(56) References Cited

U.S. PATENT DOCUMENTS

| | | | |
|---|---|---|---|
| 2008/0259040 A1* | 10/2008 | Ording et al. | 345/173 |
| 2008/0318635 A1 | 12/2008 | Yoon | |
| 2009/0058830 A1* | 3/2009 | Herz et al. | 345/173 |
| 2009/0100380 A1 | 4/2009 | Gardner | |
| 2009/0109182 A1* | 4/2009 | Fyke et al. | 345/173 |
| 2009/0167700 A1 | 7/2009 | Westerman et al. | |
| 2009/0228842 A1* | 9/2009 | Westerman et al. | 715/863 |
| 2009/0282360 A1* | 11/2009 | Park et al. | 715/786 |
| 2009/0289917 A1* | 11/2009 | Saunders | 345/174 |
| 2010/0083166 A1* | 4/2010 | Happonen | 715/784 |
| 2010/0123669 A1* | 5/2010 | Chae et al. | 345/173 |
| 2010/0156813 A1* | 6/2010 | Duarte et al. | 345/173 |
| 2010/0231612 A1* | 9/2010 | Chaudhri et al. | 345/684 |
| 2010/0235729 A1* | 9/2010 | Kocienda et al. | 715/255 |
| 2010/0259562 A1* | 10/2010 | Miyazawa et al. | 345/684 |
| 2011/0035209 A1* | 2/2011 | Macfarlane | 704/9 |
| 2011/0122159 A1* | 5/2011 | Bergsten et al. | 345/684 |
| 2011/0167341 A1* | 7/2011 | Cranfill et al. | 715/702 |
| 2011/0210922 A1* | 9/2011 | Griffin | 345/173 |
| 2011/0239153 A1* | 9/2011 | Carter et al. | 715/784 |

FOREIGN PATENT DOCUMENTS

| | | |
|---|---|---|
| EP | 2068236 | 6/2009 |
| WO | 2008/025370 A1 | 3/2008 |
| WO | 2010026493 A | 3/2010 |

OTHER PUBLICATIONS

Office Action dated Sep. 5, 2012, issued in respect of corresponding Chinese Patent Application No. 201110065617.8.
Office Action dated May 31, 2013, issued in respect of corresponding Chinese Patent Application No. 201110065617.8.
Examiner's Report dated Mar. 26, 2013, issued in respect of corresponding Canadian Patent Application No. 2,731,603.

* cited by examiner

PORTABLE ELECTRONIC DEVICE AND METHOD OF CONTROLLING SAME

FIELD OF TECHNOLOGY

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in electronic devices with touch-sensitive displays are desirable.

DETAILED DESCRIPTION

The following describes an apparatus for and method of scrolling through information displayed on a touch-sensitive display of a portable electronic device. A gesture on the touch-sensitive display is detected and an origin and direction of gesture is determined. The information is scrolled in a mode dependent on the origin of the gesture.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

Figure 1:
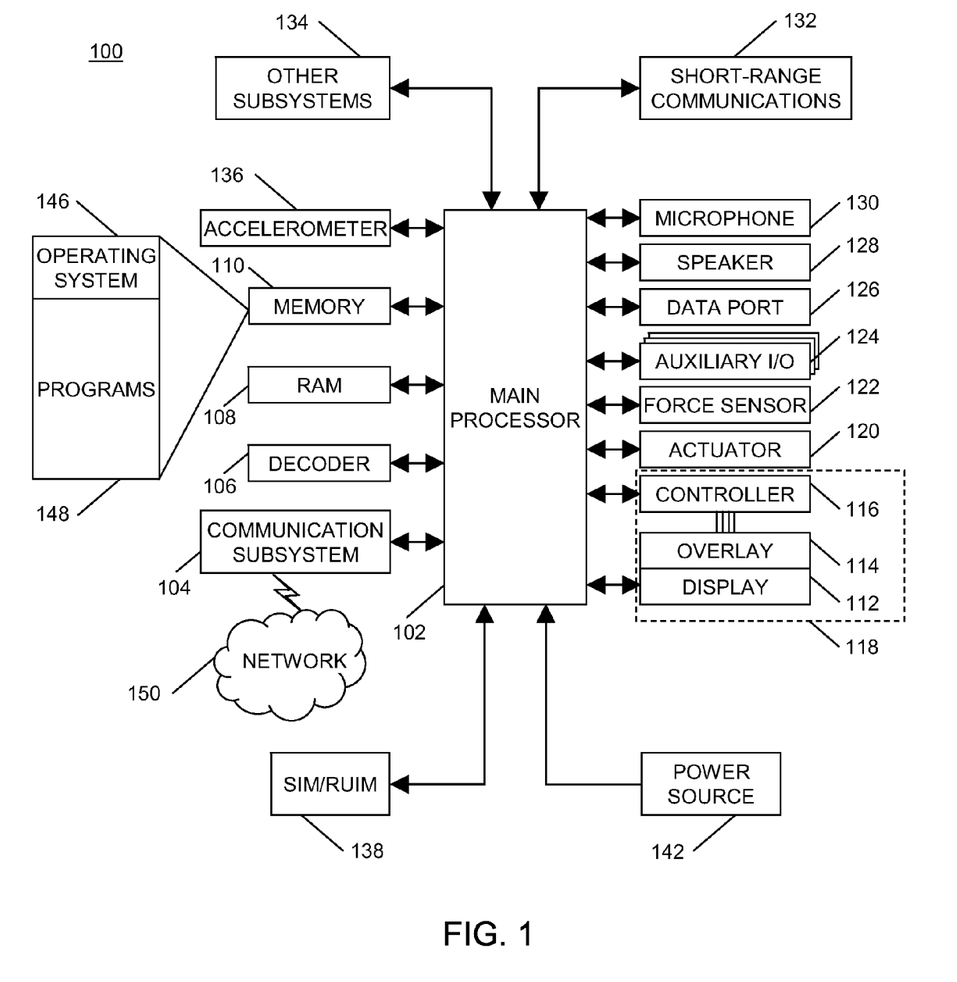
FIG. 1 is a block diagram of a portable electronic device in accordance with the present disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132, and other device subsystems 134. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuator(s) 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 may result in provision of tactile feedback.

A mechanical dome switch actuator may be utilized. In this example, tactile feedback is provided when the dome collapses due to imparted force and when the dome returns to the rest position after release of the switch.

Alternatively, the actuator 120 may comprise one or more piezoelectric (piezo) actuators that provide tactile feedback for the touch-sensitive display 118. Contraction of the piezo actuator(s) applies a spring-like force, for example, opposing a force externally applied to the touch-sensitive display 118. Each piezo actuator includes a piezoelectric device, such as a piezoelectric disk, adhered to a substrate such as a metal substrate. The substrate bends when the piezoelectric device contracts due to build up of charge/voltage at the piezoelectric device or in response to a force, such as an external force applied to the touch-sensitive display 118. The charge/voltage may be adjusted by varying the applied voltage or current, thereby controlling the force applied by the piezo actuators. The charge/voltage at the piezo actuator may be removed by a controlled discharge current that causes the piezoelectric device to expand, releasing the force thereby decreasing the force applied by the piezo actuators. The charge/voltage may advantageously be removed over a relatively short period of time to provide tactile feedback to the user. Absent an external force and absent a charge/voltage at the piezo actuator, the piezo actuator may be slightly bent due to a mechanical preload.

The touch-sensitive display 118 is configured to display information from an application, such as a web browser, contacts, email, calendar, music player, spreadsheet, word processing, operating system interface, and so forth, in a display area. A virtual keyboard may be displayed in an input area, for example, below the display area in the orientation of the portable electronic device 100 and includes keys for entry of alphanumeric characters, punctuation or symbols.

The touch-sensitive display 118 is also configured to detect a gesture. A gesture, such as a swipe, is a type of touch, also known as a flick, that begins at an origin and continues to a finish point while touch contact is maintained. A swipe may be long or short in distance and/or duration. Two points of the swipe are utilized to determine a vector that describes a direction of the swipe. The direction may be referenced with respect to the touch-sensitive display 118, the orientation of the information displayed on the touch-sensitive display 118, or another reference. For the purposes of providing a reference, "horizontal" as utilized herein is substantially left-to-right or right-to-left relative to the orientation of the displayed information, and "vertical" as utilized herein is substantially upward or downward relative to the orientation of the displayed information. The origin and the finish point of the swipe may optionally be utilized to determine the magnitude or distance of the swipe. The duration of the swipe is determined from the origin and finish point of the swipe in time. The controller 116 and/or the processor 102 determine the direction, magnitude, and/or duration of the swipe.

When a gesture such as a swipe is detected and associated with the display area of the touch-sensitive display 118, page scrolling within the information occurs. Page scrolling is a mode of scrolling in which the information may be advanced or reversed as the information is displayed. The direction of page scrolling may be based on the direction of the swipe. When a swipe is associated with the input area of the touch-sensitive display 118, cursor scrolling of the information occurs. Cursor scrolling is a mode of scrolling in which a cursor is rendered on the touch-sensitive display 118 and may be advanced or reversed, depending on the direction of the swipe, through the information displayed on the touch-sensitive display. The cursor scrolls through the information while maintaining display of the cursor. Alternatively, cursor scrolling may be utilized when a gesture is associated with the display area, and page scrolling may be utilized when a gesture is associated with the input area.

Because a touch-sensitive display 118 on a portable electronic device 100 is typically relatively small, the amount of information displayed is typically much less than the amount of information that may be displayed, for example, on a computer monitor or other larger device. Information from an application, based on the screen size and memory capability of the device controlling the display of information on the screen, is available to be displayed using scrolling techniques. The amount of information is often more than fits on a screen or window at one time.

The information may comprise, for example, a webpage, electronic messaging or mail text, contact details, calendar event details, spreadsheet data, text or word processing, to name a few. For example, when entering calendar event details for scheduling a calendar event, the calendar application may display of 10 lines of information at a time while displaying a virtual keyboard for entry of data in fields of the calendar event. The calendar event, however, may include 50 lines of information. Typically, a user may advance or reverse through the information by scrolling using a control such as a button or menu option. The use of a scrolling mode that is determined based on the association of the gesture, such as the gesture's origin, finish point, or other attribute, rather than selection of a button or use of a menu facilitates quicker, seamless navigation and interaction. Page scroll or cursor scroll may be immediately engaged or utilized at any time. Without the need to find and press a button or to enter a menu, the process of navigating to view, add, delete, and edit data is faster.

Figure 2:
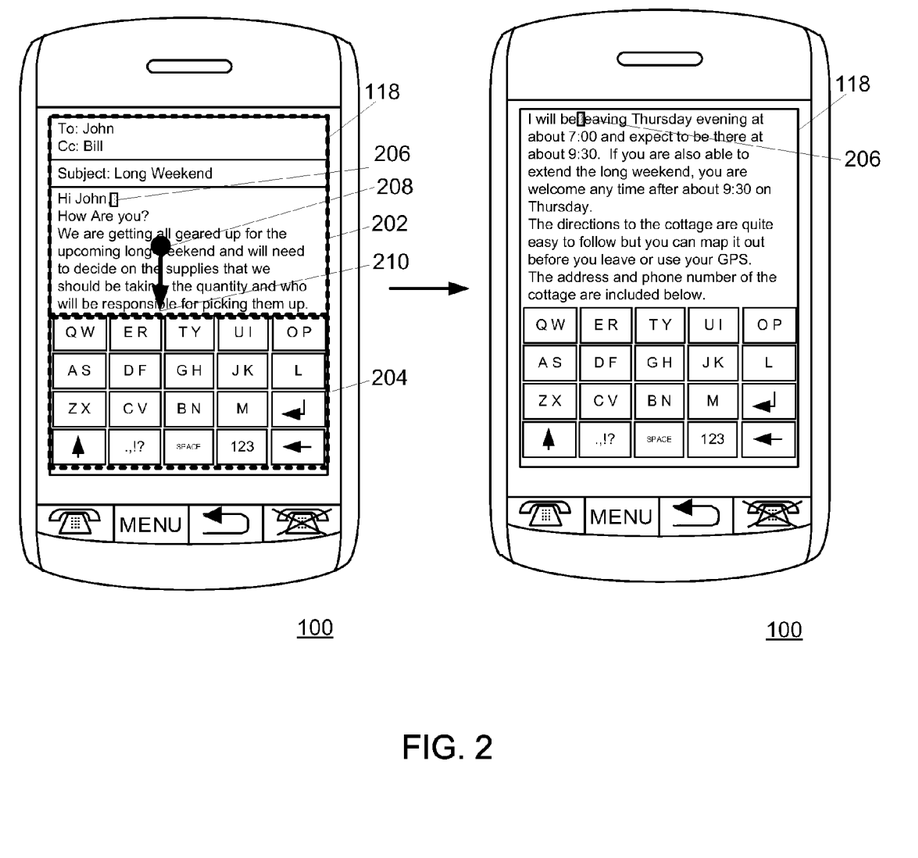
FIG. 2 illustrates examples of a display before and after scrolling in a first mode in accordance with the present disclosure.
Figure 3:
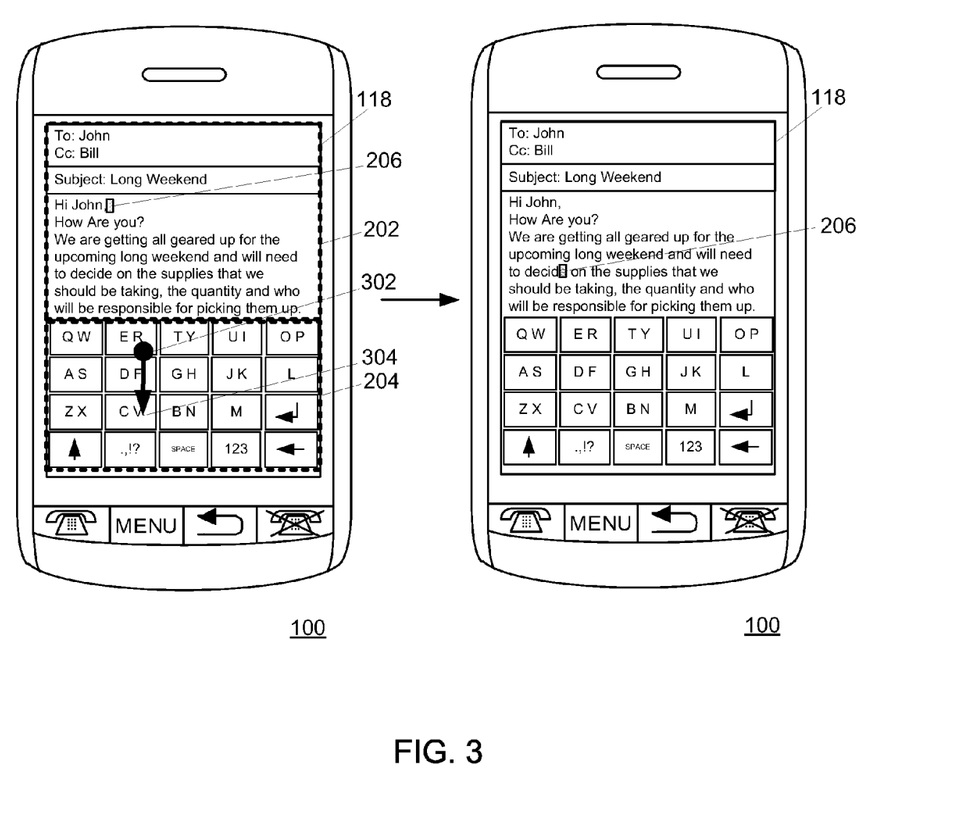
FIG. 3 illustrates examples of a display before and after scrolling in a second mode in accordance with the present disclosure.

An example of a touch-sensitive display 118 before and after scrolling in a first mode is shown in FIG. 2, and an example of a touch-sensitive display 118 before and after scrolling in a second mode is shown in FIG. 3. In these examples, the portable electronic device 100 is utilized for composing and sending an email utilizing an email application. Information entered is displayed in a display area 202 of the touch-sensitive display 118, and a virtual keyboard is displayed in an input area 204 of the touch-sensitive display 118. The display area 202 is disposed above the input area 204 in the orientation in which the information is displayed. The virtual keyboard includes keys for entry of characters such as letters, numbers, punctuation, symbols, and so forth, as well as functions, such as shift, enter, or delete, for composing the email and may be a reduced keyboard in which at least some of the keys are associated with multiple alphabetical letters. Optionally, the keyboard may be a full keyboard in which each alphabetical letter is associated with a respective key.

The information includes, for example, email header fields such as a "To" field, a "Cc" field, a "Subject" field and a body field. Each of the fields of the email may be edited during composition of the email and a cursor 206 is shown rendered in the information. The cursor 206 indicates, for example, the position, within the information, at which additions, deletions, or edits may be made. The user may scroll through the email in the page scrolling mode to view or edit any of the fields of the email. The origin 208 is shown in FIG. 2 in the display area 202 on the touch-sensitive display 118 and the direction of the gesture is downward with respect to the displayed information, to the finish point at the tip of the arrow 210. When the gesture is detected, the touch-sensitive display 118 advances through the information, thereby displaying different information. Similarly, page scrolling may be in the reverse direction to display prior information utilizing an upward gesture with respect to the displayed information and with the origin of the gesture in the display area 202. Page scrolling may additionally occur in the horizontal direction with respect to the displayed information.

Optionally, the length of the gesture, either by distance or time duration, may be utilized to determine what part of the information to display or to determine how far to advance or reverse the information. Two, three, or more levels of distinction may be utilized. For example, a two-level system divides gestures into short gestures and long gestures, wherein one or more thresholds are utilized to determine whether a gesture is considered long or short. A short gesture advances or reverses the information by an amount, such as shown in FIG. 2 and a long gesture advances or reverses the information a greater amount.

A long gesture may be utilized to jump to the end or the beginning of the information or may be interpreted as advancing or reversing the information by a large amount. The amount of scrolling may vary depending on the amount of information.

A three-level system divides gestures into short gestures, medium gestures, and long gestures, wherein two or more thresholds are utilized to determine whether a gesture is considered short, medium, or long. For example, short gesture may be interpreted as advancing or reversing by an amount, a medium gesture may be interpreted as advancing or reversing by a greater amount, and a long gesture may be interpreted as advancing or reversing to the end or start of the information. The thresholds for the length may be based on dimensions of the touch-sensitive display 118. Alternatively, the long gesture may be interpreted as one that begins on the screen and continues off the edge of the screen 118, whereas the short and medium gestures are determined by a threshold and these gestures both originate and end on the screen 118.

The user may scroll through the email in the cursor scrolling mode to move the cursor 206 within the information. The origin 302 is shown in FIG. 3 in the input area 204 on the touch-sensitive display 118, and the direction of the gesture is downward with respect to the displayed information, to the finish point at the tip of the arrow 304. When the gesture is detected, the touch-sensitive display 118 moves the cursor 206 to a new location within the information. The movement of the cursor is advantageously in the same direction as the direction of the gesture. Thus, the cursor 206 may be moved within the information without page scrolling through the information. For example, when the cursor 206 is located near the top of the display area 202 and a downward gesture is detected with an origin in the input area 204, cursor scrolling is initiated. The information displayed on the touch-sensitive display 118 may, however, be advanced to move the cursor within the information during cursor scrolling, for example, when the cursor 206 is located near the bottom of the display area 202 and a downward gesture is detected with an origin in the input area 204. Cursor scrolling may also occur in the reverse direction, to move the cursor up in the information, for example, when an upward swipe is detected with the origin of the gesture in the input area 204. Cursor scrolling may occur horizontally to move the cursor laterally within the information. Detection of a horizontal gesture, from right to left or from left to right, such as the gesture with origin 402 in the input area 204 shown in FIG. 4.

Figure 4:
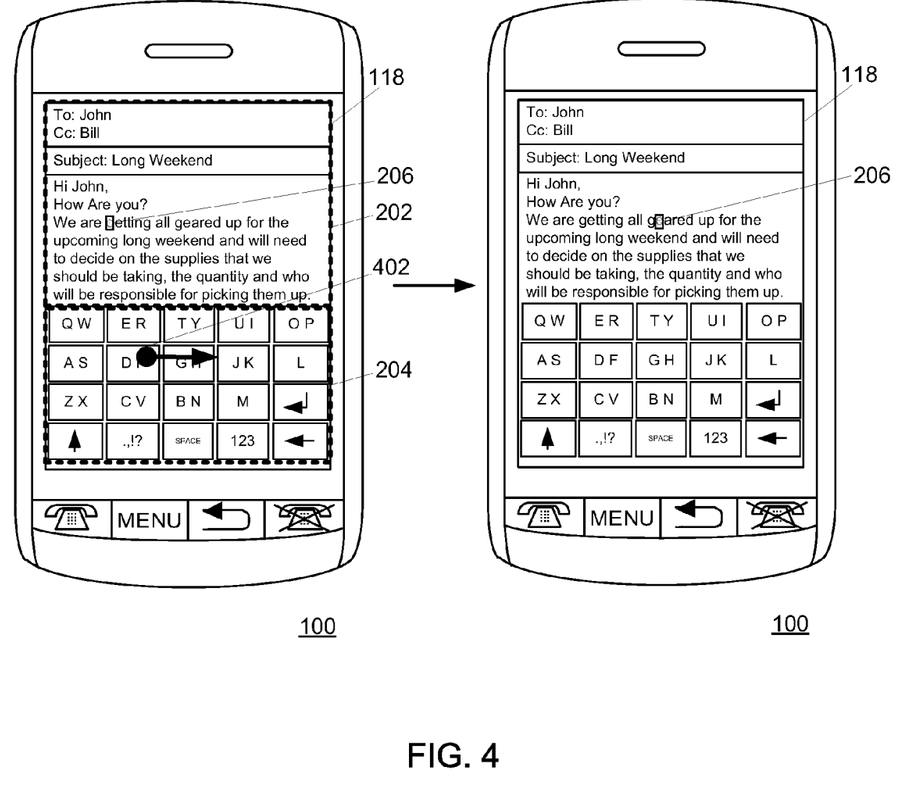
FIG. 4 illustrates examples of a display before and after scrolling in a second mode in accordance with the present disclosure.

Optionally, the length of the gesture, either by distance or time duration, may be utilized to determine how far to advance or reverse the cursor 202 within the information. Two, three, or more levels of distinction may be utilized. A short gesture may advance or reverse the cursor by one line of information or one character and a long gesture may advance or reverse the cursor by more than one line of information or more than one character.

A long gesture may be utilized to move the cursor to the end or the beginning of the information for a generally vertical gesture or may be used to move the cursor to the end or beginning of a line for a generally horizontal gesture. Alternatively, a long gesture may be interpreted as advancing or reversing the cursor within the information by multiple lines or characters. The number of multiples may vary.

Figure 5:
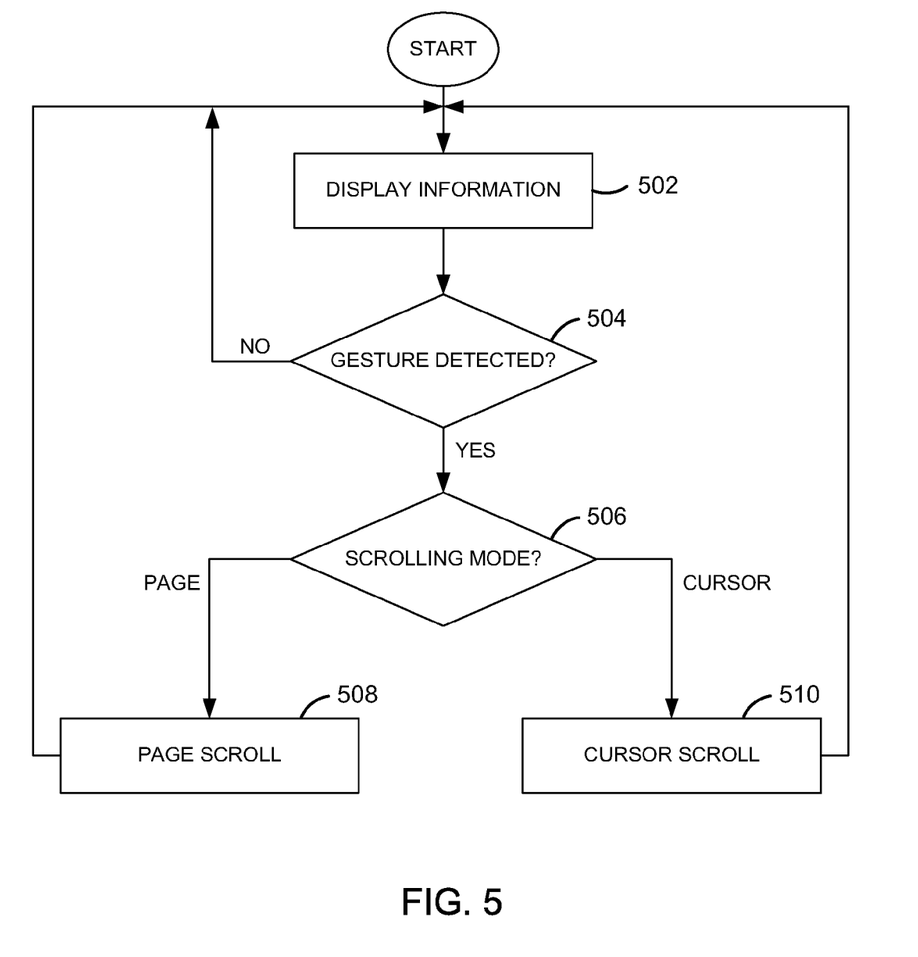
FIG. 5 is a flowchart illustrating a method of scrolling through displayed information on a portable electronic device in accordance with the present disclosure.

FIG. 5 is a flowchart illustrating a method of displaying information based on a detected gesture. The method may be carried out by software executed by, for example, the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium. Information is displayed 502 on the touch-sensitive display 118 of the portable electronic device 100. In the example shown, an email is navigated through in an email application. When a gesture is detected 504, an association of the gesture with an area of the touch-sensitive display 118 is determined. For example, an origin, finish point, percentage of gesture located in an area, or other characteristic may be identified to determine which area, e.g., display area 202 or input area 204, is associated with the gesture. A direction of the gesture may also be determined, and the direction of scrolling may be based on the direction of the gesture. The scrolling mode is determined 506 based on the association, e.g., origin, finish point, percentage of area, and so forth. When the association of the gesture is with the display area 202 of the touch-sensitive display 118, e.g., when the origin of the gesture is at a location associated with the display area 202, the page scrolling mode is utilized, and the information is page scrolled 508, for example, based on the direction of the gesture. The page scrolling mode may optionally include determining a length of the gesture and displaying a different part of the information based on the length of the gesture. When the association of the gesture is with the input area 204 of the touch-sensitive display 118, e.g., when the origin of the gesture is at a location associated with the input area 204, the cursor scrolling mode is utilized, and the cursor 202 is scrolled 510 through the information.

A method of controlling a portable electronic device that has a touch-sensitive display, includes displaying information on the touch-sensitive display, detecting a gesture on the touch-sensitive display, scrolling through the information in a first scrolling mode when the gesture is associated with a first area of the touch-sensitive display, and scrolling through the information in a second scrolling mode when the gesture is associated with a second area of the touch-sensitive display.

A computer-readable medium has computer-readable code embodied therein that is executable by at least one processor of a portable electronic device to perform the above method.

A portable electronic device includes a touch-sensitive display configured to display information. A processor is configured to detect a gesture on the touch-sensitive display, scroll through the information in a first scrolling mode when the gesture is associated with a first area of the touch-sensitive display, and scroll through the information in a second scrolling mode when the gesture is associated with a second area of the touch-sensitive display.

The method of scrolling described herein facilitates interaction and selection, for example, of a cursor position within information displayed for editing. A detected swipe on a touch screen display may be utilized to scroll in either of two modes, in any direction for viewing the information. The mode for scrolling is determined based on the association of the gesture with a display area, and enables scrolling in either of the two modes without requiring any further button, menu, or other more time-consuming process. Thus, different parts of information may be displayed and/or edited more quickly, decreasing power requirements, and increasing battery life, and providing an improved user experience.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
displaying first information for a first application in a first area of a touch-sensitive display and second information for the first application in a second area of the touch-sensitive display, wherein the first information comprises text and the second information comprises a virtual keyboard;
detecting a gesture on the touch-sensitive display;
when the gesture begins in the first area of the touch-sensitive display, scrolling through the text to display different text in the first area;
when the gesture begins on the keyboard in the second area of the touch-sensitive display, scrolling a cursor through the text in a direction dependent on a direction of the gesture;
wherein the amount of scrolling is dependent on the length of the gesture.

2. The method according to claim 1, wherein the second information is not scrolled through when the gesture begins in the second area.

3. The method according to claim 1, wherein the virtual keyboard is displayed while scrolling through the first information.

4. The method according to claim 1, wherein scrolling the first information comprises page scrolling.

5. The method according to claim 1, wherein detecting a gesture comprises detecting a swipe.

6. The method according to claim 1, comprising determining an origin and a direction of the gesture.

7. The method according to claim 1, wherein the virtual keyboard is configured to receive input for display in the first area and the first information includes the input.

8. A non-transitory computer-readable medium having computer-readable code executable by at least one processor of the portable electronic device to perform the method of claim 1.

9. A portable electronic device comprising:
a touch-sensitive display configured to display first information for a first application in a first area of the touch-sensitive display and second information for the first application in a second area of the display, wherein the first information comprises text and the second information comprises a virtual keyboard;
a processor configured to:
detect a gesture on the touch-sensitive display;
when the gesture begins in the first area of the touch-sensitive display, scroll the text to display different text in the first area;
when the gesture begins on the keyboard in the second area of the touch-sensitive display, scroll a cursor through the text in a direction dependent on a direction of the gesture;
wherein the amount of scrolling is dependent on the length of the gesture.

10. The portable electronic device according to claim 9, wherein the second information is not scrolled when the gesture begins in the second area.

11. The portable electronic device according to claim 9, wherein keyboard is displayed while scrolling through the first information.

12. The portable electronic device according to claim 9, wherein scrolling through the first information comprises a page scrolling.

13. The portable electronic device according to claim 9, wherein detecting a gesture comprises detecting a swipe.

14. The portable electronic device according to claim 9, wherein the virtual keyboard is configured to receive input for display in the first area and the first information includes the input.

15. A method comprising:
- displaying text in a first area of a touch-sensitive display;
- displaying a keyboard in a second area of the touch-sensitive display, wherein the text displayed in the first area comprises text entered by the keyboard;
- detecting a gesture on the touch-sensitive display;
- when the gesture begins in the first area of the touch-sensitive display, scrolling the text to display different text in the first area;
- when the gesture begins on the keyboard in the second area of the touch-sensitive display, scrolling a cursor through the text in a direction dependent on a direction of the gesture;
- wherein the amount of scrolling is dependent on the length of the gesture.

* * * * *